(12) United States Patent
O'Leary et al.

(10) Patent No.: US 6,910,667 B2
(45) Date of Patent: Jun. 28, 2005

(54) STRETCH RELEASABLE TAPE FLAG (75) Inventors: Timothy J. O'Leary, White Bear Lake, MN (US); Eiji Mizuno, Yokahama (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/172,962

(22) Filed: Jun. 17, 2002

(65) Prior Publication Data

US 2003/0232190 A1 Dec. 18, 2003

(51) Int. Cl.[7] ............................... C09J 7/02; B32B 7/12
(52) U.S. Cl. ............ 248/205.3; 428/354; 428/355 RA; 428/355 AC; 428/343
(58) Field of Search .................... 428/354, 355 RA, 428/355 AC, 343; 221/33; 248/205.3

(56) References Cited

U.S. PATENT DOCUMENTS

| | | |
|---|---|---|
| 3,691,140 A | 9/1972 | Silver |
| 3,857,731 A | 12/1974 | Merrill, Jr. et al. |
| 4,024,312 A | 5/1977 | Korpman |
| 4,166,152 A | 8/1979 | Baker et al. |
| 4,770,320 A | 9/1988 | Miles et al. |
| 4,907,825 A | 3/1990 | Miles et al. |
| 5,409,189 A | 4/1995 | Lühmann |
| 5,516,581 A | 5/1996 | Kreckel et al. |
| 5,518,144 A | 5/1996 | Samuelson et al. |
| 5,524,929 A * | 6/1996 | Emmel et al. ............. 281/211 |
| 5,571,617 A | 11/1996 | Cooprider et al. |
| 5,755,356 A | 5/1998 | Bastiaens et al. |
| 5,939,161 A | 8/1999 | Callahan, Jr. et al. |
| 6,231,962 B1 | 5/2001 | Bries et al. |
| 6,251,512 B1 | 6/2001 | Gustafson et al. |

FOREIGN PATENT DOCUMENTS

| | | |
|---|---|---|
| DE | 33 31 016 C2 | 7/1992 |
| JP | 2001-030403 | 2/2001 |
| JP | 2002-6-11 | 6/2002 |
| WO | WO 98/03601 | 1/1998 |
| WO | WO 00/12644 | 3/2000 |
| WO | WO 01/66664 A2 | 9/2001 |

* cited by examiner

Primary Examiner—Daniel Zirker
(74) Attorney, Agent, or Firm—David B. Patchett (57) ABSTRACT

A stretch releasable adhesive strip includes an extensible backing layer including a first adhesive region and a flexible support layer attached to the backing layer adjacent the first adhesive region that includes a second adhesive region of a repositionable pressure sensitive adhesive. To make the adhesive strip easier to handle and write on, the support layer is stiffer than the backing layer.

10 Claims, 4 Drawing Sheets

STRETCH RELEASABLE TAPE FLAG

FIELD OF THE INVENTION

The present invention relates generally to a tape strip used to mark portions of documents and, more particularly, to a tape strip that can be securely adhered to a document and subsequently removed cleanly without damaging the document by stretching the tape strip.

BACKGROUND OF THE INVENTION

Repositionable tape strips or tape flags, such as the widely used Post-It® Flags sold by Minnesota Mining and Manufacturing Company, have become a staple office supply product throughout the world for temporarily marking portions of documents. Such tape flags are known in the patented prior art. U.S. Pat. No. 4,907,825 (Miles et al.) and U.S. Pat. No. 4,770,320 (Miles et al.), for example, describe a sheet including an elongate layer of flexible polymeric material having a coating of repositionable pressure sensitive adhesive on one of its side surfaces along a second end portion, while being free of adhesive on both of its side surfaces along a first end portion thereof. Such a tape flag or sheet is useful for marking a portion of a document by having its second end portion adhered thereto while its first end portion projects beyond an edge of the document so that the marked portion of the document can be readily identified.

Tape flags have generally been provided with repositionable adhesive to allow the tape flags to be repositioned or removed from a document without damaging the document. This has led to the perception, however, that such tape flags may inadvertently become detached from a document. This is of particular concern when marking certain documents such as important medical and legal documents. As a result, a need exists for a tape flag that can be securely adhered to a document but which can also be cleanly removed therefrom without damaging the document.

It would therefore be desirable to provide a tape flag that can be securely adhered to a document using an adhesive having an adhesive strength greater than that of a repositionable adhesive but which can be cleanly removed from the document without damaging it.

SUMMARY OF THE INVENTION

The present invention provides a stretch releasable adhesive article including a support strip having a first flexural strength, an extensible backing strip attached to the support strip, the backing strip having a flexural strength less than the support strip flexural strength, and an exposed first adhesive region of a first pressure sensitive adhesive arranged on at least a portion of the backing strip for adhering the stretch releasable adhesive article to a substrate.

In one embodiment, the stretch releasable adhesive article includes a second adhesive region of a repositionable pressure sensitive adhesive on at least a portion of the support strip adjacent the first adhesive region. In another embodiment, the second adhesive region of a repositionable pressure sensitive adhesive is provided on at least a portion of the backing strip adjacent the first adhesive region.

In another embodiment, the support strip and the backing strip are arranged in overlapping relation. In another embodiment, the support strip and the backing strip have adjoining ends and coplanar opposed first and second major surfaces.

In one aspect of the invention, the backing strip comprises a layer of an extensible film having an elongation at break of at least 50%. The film generally has a Young's modulus of at least 250 psi, preferably at least 500 psi, and more preferably at least 750 psi. The extensible film generally has a thickness of less than about 300 micrometer, preferably less than about 250 micrometers, and more preferably less than about 200 micrometers. In another aspect of the invention, the support strip is a layer of generally non-extensible flexible polymeric material. The support strip has a thickness generally ranging from about 10 micrometers to about 150 micrometers, preferably from about 15 micrometers to about 125 micrometers, and more preferably from about 20 micrometers to about 75 micrometers.

In a specific embodiment of the invention, the backing strip includes a first end portion having opposed first and second major surfaces and a second end portion having first and second major surfaces, and the first adhesive region is provided on the backing strip first end portion first major surface, and the support strip is arranged along the backing strip second end portion first major surface.

In another embodiment, the backing strip includes a first end portion having opposed first and second major surfaces and a second end portion having first and second major surfaces, and the first adhesive region is provided on the backing strip first end portion first major surface, and the support strip is arranged along the backing strip second end portion first major surface, and the second adhesive region is provided on the support strip adjacent the backing strip adjacent the first major surface.

In another embodiment, the support strip includes a first end portion arranged between the backing strip and the second adhesive region, and further includes a non-adhesive second end portion extending outwardly from between the backing strip and the second adhesive region.

In another embodiment, the support strip includes a first end portion arranged between the backing strip and the second adhesive region and further includes a second end portion extending around at least a portion of the backing second end portion.

In another embodiment, at least a portion of the backing strip is arranged between the first adhesive region and a first end portion of the support strip. The support strip includes a first end portion adjacent at least a portion of the backing strip, an intermediate portion extending from the support strip first end portion beyond the backing strip, and a non-adhesive second end portion extending from the intermediate portion. The intermediate portion is provided with the second adhesive region adjacent the backing strip.

In another embodiment, the support strip includes a first end portion embedded in and surrounded by the backing strip and a non-adhesive second end portion extending outwardly from the backing strip, and both the first and second adhesive regions are provided on the backing strip.

In another embodiment, the present invention provides a stretch releasable adhesive article wherein the support strip and the backing strip have a common longitudinal axis, adjoining ends, and coplanar opposed first and second major surfaces. The first adhesive region is provided on the backing strip first major surface, and the second adhesive region is provided on the support strip first major surface adjacent the first adhesive region.

In another embodiment, the backing strip is folded around an end portion of the support layer, and the backing layer includes a first end portion removably adhered to a first major surface of the support layer, a second end portion attached to a second major surface of the support layer opposite the first major surface, and a hinge portion connecting the first end portion with the second end portion. In this manner, the backing layer first end portion can be separated from the support layer and the support layer can be pivoted to allow the article to be stretched removed from a surface.

In a specific embodiment, the present invention provides a stretch removable tape flag for temporarily marking items including an extensible backing layer having first and second opposed major surfaces and first and second end portions, the first end portion first surface including a first adhesive region of a permanent pressure sensitive adhesive, and a flexible support layer attached to the backing layer first surface adjacent the first adhesive region, the support layer including a second adhesive region of a repositionable pressure sensitive adhesive opposite the backing layer adjacent the first adhesive region, wherein the support layer having a flexural strength greater than the backing layer flexural strength.

In yet another aspect, the present invention provides a dispenser package including a plurality of stretch removable adhesive sheets, each sheet comprising a support strip having a first flexural strength, an extensible backing strip attached to the support strip, the backing strip having a second flexural strength less than the support strip first flexural strength and an exposed first adhesive region of a first pressure sensitive adhesive arranged on at least a portion of the backing strip for adhering the stretch releasable adhesive article to a substrate, and an enclosure including walls defining a chamber in which the stack of sheet is positioned, the walls including a top wall containing a transverse slot through which an end portion of an uppermost sheet of the stack projects.

In this application:

"Permanent pressure sensitive adhesive" refers to a pressure sensitive adhesive that has a high peel strength which is greater than the peel strength of a repositionable adhesive.

"Repositionable pressure sensitive adhesive" refers to a pressure sensitive adhesive of the type which allows repeated removal and reapplication from an object without damage.

BRIEF DESCRIPTION OF THE DRAWING

The present invention will be further described with reference to the accompanying drawings wherein like reference numerals refer to like or corresponding parts throughout the several views, and wherein:

FIG. 3a is a sectional side view of the stretch releasable tape flag of FIG. 1 adhered to a book, document, or the like;

FIG. 3b is a sectional side view of the stretch releasable tape flag of FIG. 1 partially removed from the book of FIG. 3a;

FIG. 3c is a sectional side view of the stretch releasable tape flag of FIG. 1 being stretch removed from the book of FIG. 3a;

DETAILED DESCRIPTION

Figure 1:
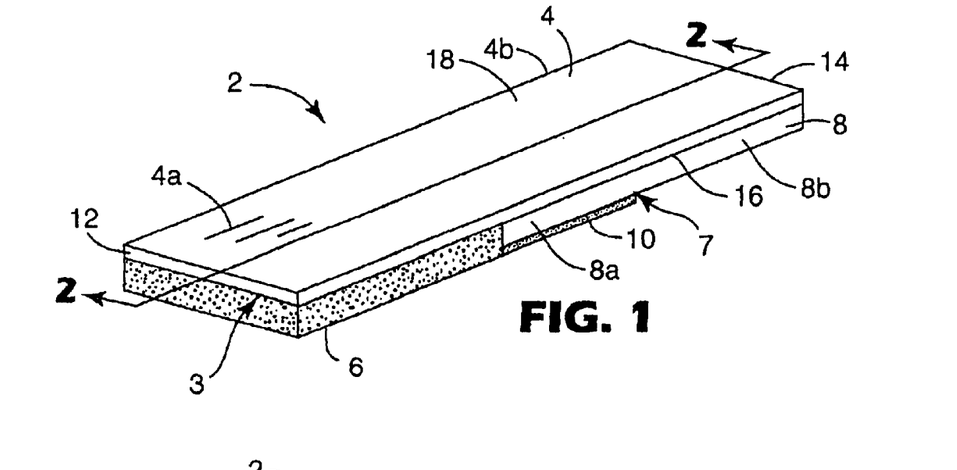
FIG. 1 is a perspective view of a first embodiment of a stretch releasable tape flag according to the invention.
Figure 2:
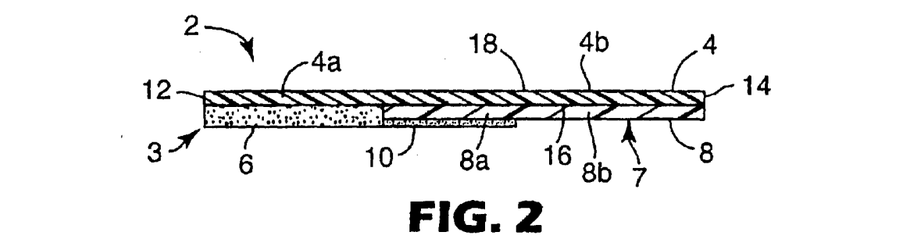
FIG. 2 is a sectional view taken along line 2—2 of FIG. 1.

Referring now to the drawings wherein functionally similar features in the several embodiments are referred to with like reference numerals incremented by 100, FIGS. 1 and 2 show a stretch releasable tape flag 2 including a stretch releasable tape strip 3 comprising an elongate rectangular backing layer 4 having a first adhesive region 6 of a first pressure sensitive adhesive (PSA), and a support tape strip 7 comprising an elongate rectangular support layer 8 and a second adhesive region 10 of a second PSA. The backing layer 4 and support layer 8 may be coextruded, adhesively bonded, laminated, heat welded, or joined using other known techniques.

The backing layer 4 is a thin flexible sheet of stretchable or extensible material having first and second ends 12 and 14, opposed first and second major surfaces 16 and 18, a first 4a end portion adjacent the first adhesive region 6, and a second end portion 4b adjacent the support layer 8. The support layer 8 extends along and is affixed to the first major surface 16 of the second end portion 4b of the backing layer 4 from adjacent the first adhesive region 6 to the second end 14, and includes a first end portion 8a arranged between the backing layer second end portion 4b and the second adhesive region 10 and a second end portion 8b that extends beyond the second adhesive region 10 adjacent the backing layer second end portion 4b. Support layer 8 is a thin flexible sheet of a generally non-stretchable or non-extensible material.

Suitable stretch releasable tape strips 3 include extensible adhesive tape strips that have strong holding power but which are cleanly removable from a surface by stretching. Such adhesive tape strips are known in the patented prior art. U.S. Pat. No. 4,024,312 (Korpman), for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface.

In addition, the stretch releasable tape strip 3 may be a solid pressure sensitive adhesive which itself provides the adhesive region 6 and therefore eliminates the need to apply a PSA separately to an otherwise non-adhesive backing layer 4. A suitable solid pressure sensitive adhesive is disclosed in German Patent No. 33 31 016 which discloses a high elasticity, low plasticity adhesive film based on a thermoplastic rubber and tackifying resins, wherein the adhesive bond can be broken by stretching the adhesive film in the direction of the plane of the adhesive bond.

U.S. Pat. No. 6,231,962 (Bries et al.) discloses a removable foam adhesive tape comprising a backing including a layer of polymeric foam, and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

Preferred stretch releasable tape portions 3 are disclosed in the Kreckel et al. U.S. Pat. No. 5,516,581 which discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed.

Specific materials suitable for the backing layer 4 include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used. A preferred material for the backing layer 4 is an ABA coextrusion film wherein the A is a high atactic polypropylene and the B layer is an octane copolymer.

The backing layer 4 can be in the form of single or multi-layer films, non-woven films, porous films, foam-like films, and combinations of the foregoing. Backings can also be prepared from filled materials, such as, for example, filled films, e.g., calcium carbonate filled polyolefins. The backing layer 4 is preferably selected from polyethylene and polypropylene films, with the most preferred materials being linear low density and ultra low density polyethylene films.

The preferred backing layer 4 has a Young's modulus of at least about 250 psi, preferably at least about 500 psi, and more preferably at least about 750 psi, but generally less than about 72,500 psi, preferably less than about 50,000 psi, and more preferably between about 500 psi and about 30,000 psi. The preferred backing layer also preferably has a high tensile strength and a lengthwise elongation at break of from about 50 to about 1,200%, preferably from about 150 to about 700%, more preferably from about 350 to about 700%. The preferred backing layer can have any thickness so long as it possesses sufficient integrity to be processable and handleable, with thicknesses preferably ranging from about 10 micrometers to 250 micrometers, but is preferably quite thin so as to not create unsightly bulges when applied to books, documents, or the like.

The support layer 8 is a generally non-extensible film having a flexural strength or stiffness greater than the flexural strength of the backing layer 4. The support layer 8 is provided because the backing layer 4 is constructed from a thin film that is generally flimsy and difficult to handle. The stiffness of the support layer provides the tape flag with adequate stiffness to make the tape flag easy to handle and easy to write on.

Suitable materials for the support layer 8 include films of polymethyl methacrylate, polycarbonate, polyethylene terephthalate (PET), polystyrene, polyimide, cellulose acetate, and the like. The film may include nonwoven fabric film, woven fabric films, porous films and foam films. The support layer material may also include an organic or inorganic filler dispersed in the film. Inorganic fillers include calcium carbonate, titanium oxide, silica and the like. Such fillers are useful for enhancing the film stiffness, lowering the elongation yield point to prevent the film from being easily cut, and lowering the breaking strength. A preferred support layer is a PET film having a thickness of 1.8 mils, (45.7 micrometers).

The first adhesive region 6 extends along the first major surface 16 of the first end portion 4a of the backing layer 4 from the first end 12 to adjacent the support layer 8. The second adhesive region 10 extends along an end portion of the support layer 8 adjacent the first adhesive region 6. In accordance with a characterizing feature of the invention, the first adhesive region 6 has an adhesive strength greater than the second adhesive region 10. The first adhesive region 6 is preferably a permanent pressure sensitive adhesive (i.e., an adhesive that has a high peel strength) and the second adhesive region 10 is preferably a repositionable pressure sensitive adhesive (i.e., an adhesive of the type which allows repeated removal and reapplication from an object without damage).

Suitable PSA's for the first adhesive region 6 include tackified rubber adhesives, such as natural rubber; olefins; silicones; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques. Preferred are synthetic rubber adhesives, acrylics, or acrylamides.

Suitable PSA's for the second adhesive region 10 comprising a repositionable adhesive include those from the class of adhesives based on solid inherently tacky, elastomeric microspheres, such as those disclosed in U.S. Pat. No. 3,691,140 (Silver), U.S. Pat. No. 3,857,731 (Merrill et al.), U.S. Pat. No. 4,166,152 (Baker et al.), and U.S. Pat. No. 5,571,617 (Cooprider et al.), although not limited to these examples.

A release liner (not shown) may also be provided on the adhesive regions 6 and 10 to protect the adhesive surfaces from contamination prior to use and to prevent the tape flag from inadvertently adhering to undesired surfaces or objects prior to use as is known in the art. Examples of materials suitable for use as liners include kraft papers, polyethylene, polypropylene, polyester or composites of any of these materials which can be coated with release agents such as fluorochemicals or silicone.

Figure 3A:
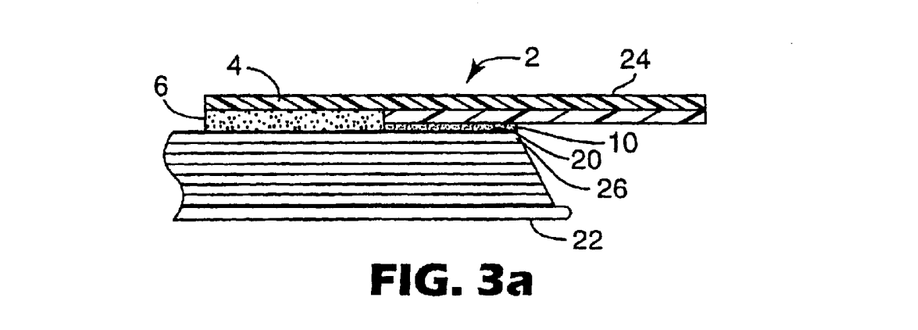
Figure 3B:
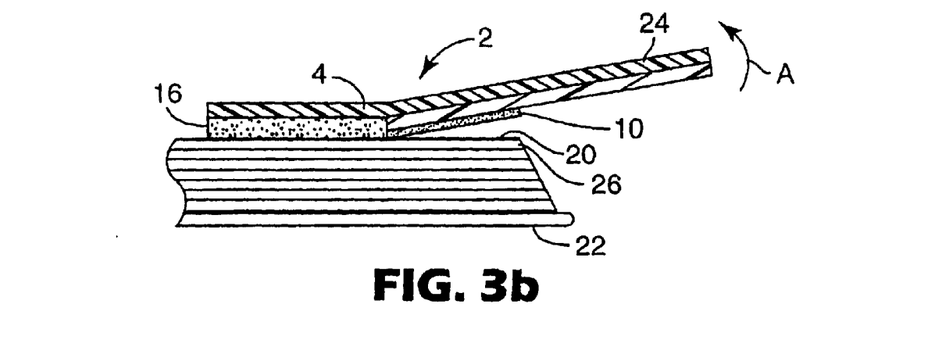
Figure 3C:
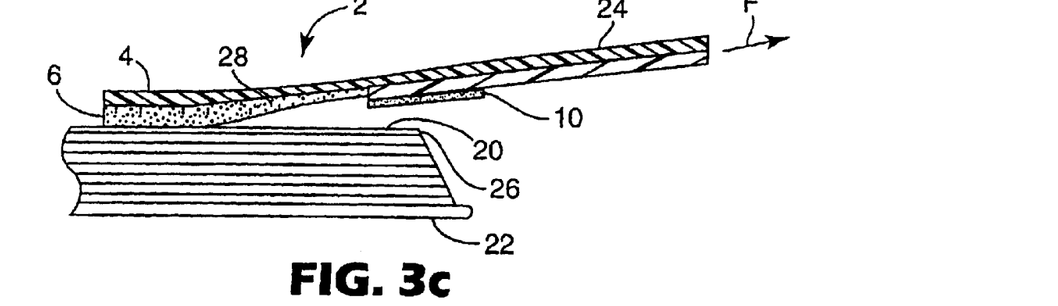

FIGS. 3a–c show the tape flag 2 being used to mark a page 20 of a book 22 and being removed from the book. When affixed to the page 20, both the first adhesive region 6 and second adhesive region 10 of the tape flag 2 are adhered to the page 20 and a terminal portion 24 projects beyond the edge 26 of the book 22.

To remove the tape flag 2 from the book 22, the terminal portion 24 is pivoted upwardly away from the book 22 as shown by arrow A in FIG. 3b until the second adhesive region 10, which comprises a repositionable adhesive, separates from the page 20. Once the second adhesive region 10 is separated from the page 20, removal of the tape flag 2 from the book is completed by applying a force in the direction indicated by arrow F in FIG. 3c to the terminal portion 24 of the tape flag 2, thereby causing the backing layer 4 and first adhesive region 6 to stretch. Upon stretching, the backing layer 4 is elongated and necks down at 28, thereby causing first adhesive region 6 to progressively and cleanly debond from the page 20 without damaging the page 20. In this manner, the tape flag 2 can be securely adhered to the book using a permanent adhesive, thereby minimizing the likelihood that the tape flag will inadvertently become separated from the book, but can be easily and cleanly removed without damaging the substrate when removal is desired.

Figure 4:
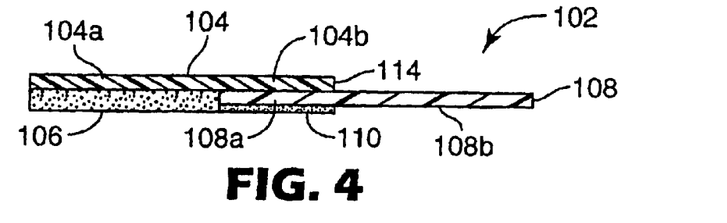
FIG. 4 is a sectional side view of a second embodiment of the invention.

Referring now to FIG. 4, there is shown a second embodiment of the tape flag 102 according to the invention that includes an extensible backing layer 104 having a first adhesive region 106 of a first PSA, and a generally non-extensible support layer 108 having a second adhesive region 110 of a second PSA. The backing layer includes a first end portion 104a adjacent the first adhesive region 106, and a second end portion 104b adjacent a first end portion 108a of the support layer 108. The support layer 108 includes a first end portion 108a arranged between the second end portion 104b of the backing layer 104 and the second adhesive region 110, and an exposed second end portion 108b that extends beyond a second end 114 of the backing layer 104. Thus, the tape flag of FIG. 4 is similar to the tape flag shown in FIGS. 1–3 except the second end portion 104b of the backing layer 104 extends along only the first end portion 108a of the support layer 108, and the second end portion 108b of the support layer 108 extends beyond the end 114 of the backing layer.

Figure 5:
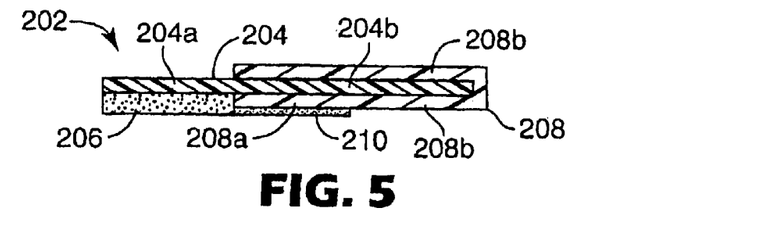
FIG. 5 is a sectional side view of a third embodiment of the invention.

FIG. 5 shows a third embodiment of the tape flag 202 according to the invention that includes an extensible backing layer 204 having a first adhesive region 206 of a first PSA and a generally non-extensible support layer 208 having a second adhesive region 210 of a second PSA. The backing layer 204 includes a first end portion 204a adjacent the first adhesive region 206, and a second end portion 204b surrounded on each side by the support layer 208. The support layer 208 includes a first end portion 208a located between the backing layer second end portion 204b and the second adhesive region 210, and a second end portion 208b that is folded back in overlapping relation with the backing layer second end portion 204b and thereby extends around the backing layer second end portion 204b.

Figure 6:
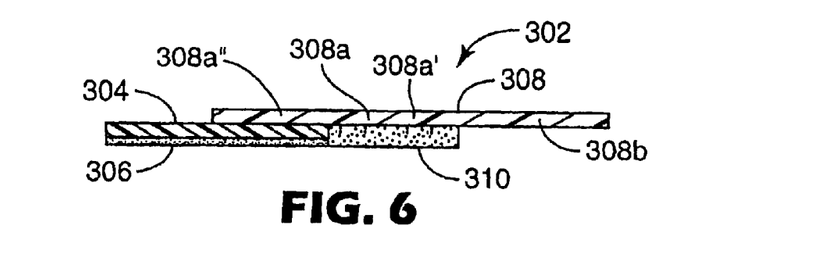
FIG. 6 is a sectional side view of a fourth embodiment of the invention.

FIG. 6 shows a fourth embodiment of the tape flag 302 according to the invention that includes an extensible backing layer 304 having a first adhesive region 306 of a first PSA and a generally non-extensible support layer 308 having a second adhesive region 310 of a second PSA. A portion of the backing layer 304 is sandwiched between the first adhesive region 306 and a first section 308a" of the support layer first end portion 308a. The support layer 308 includes a first end portion 308a and a second end portion 308b, wherein the first end portion 308a includes the first section 308a" arranged adjacent the backing layer 304 and a second section 308a' arranged adjacent the second adhesive region 310. The second end portion 308b extends beyond the second adhesive region 310 and is exposed on both sides.

Figure 7:
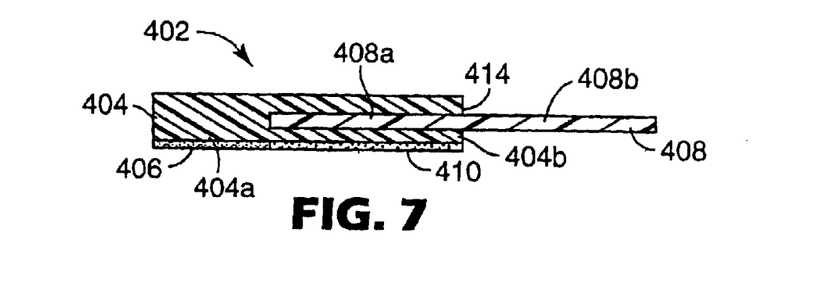
FIG. 7 is a sectional side view of a fifth embodiment of the invention.

FIG. 7 shows a fifth embodiment of the tape flag 402 according to the invention that includes an extensible backing layer 404 having a first adhesive region 406 of a first PSA and a second adhesive region 410 of a second PSA, and a generally non-extensible support layer 408. The first adhesive region 406 is located on a first end portion 404a of the backing layer 404, and the second adhesive region 410 is located on a second end portion 404b of the backing layer 404 adjacent the first adhesive region 406. Thus, in the embodiment shown in FIG. 7, both the first adhesive region 406 and second adhesive region 410 are arranged on the backing layer 404. The support layer 408 includes a first end portion 408a arranged within the backing layer 404 and an exposed second end portion 408b that extends beyond the end 414 of the backing layer second end portion 404b. Alternatively, the support layer 408 may be laminated to or otherwise fixed to the backing layer 404 without being embedded within the backing layer 404.

Figure 8:
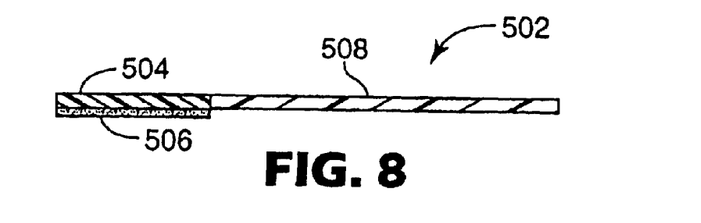
FIG. 8 is a sectional side view of a sixth embodiment of the invention.
Figure 9:
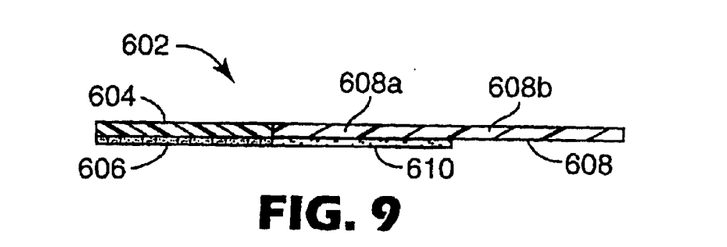
FIG. 9 is a sectional side view of a seventh embodiment of the invention.

FIG. 8 shows a sixth embodiment of the invention in which the backing layer 504 and support layer 508 have a common longitudinal axis and have opposed first and second major surfaces that are coplanar. The backing layer 504 and support layer 508 are preferably formed by co-extrusion. A first adhesive region 506 of a first PSA is provided on the backing layer 504. The tape flag 602 shown in FIG. 9 is similar to the tape flag shown in FIG. 8 except that it further includes a second adhesive region 610 of a second PSA on a first end portion 608a of the support layer 608.

Figure 10A:
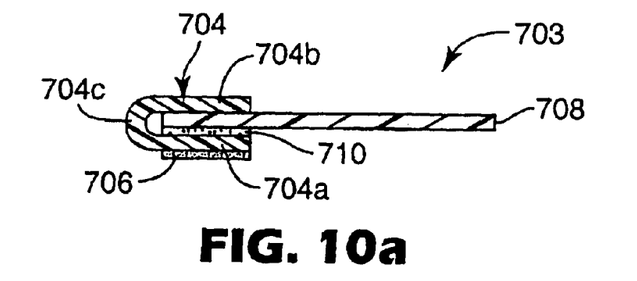
FIGS. 10a–c are a sectional side views of an eighth embodiment of the invention.
Figure 10B:
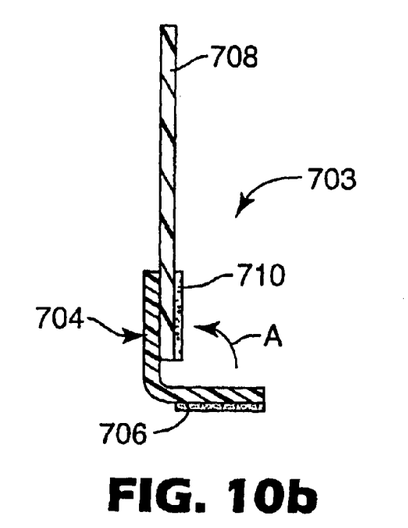
Figure 10C:
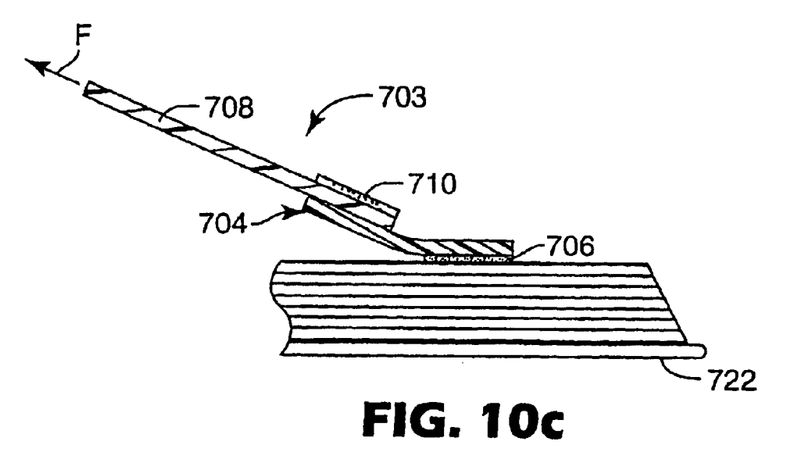

FIGS. 10a–c show a seventh embodiment of the invention in its folded condition (FIG. 10a) and as it is unfolded during the removal process (FIGS. 10b and 10c). The tape strip 703 includes an extensible backing layer 704, a non-extensible support layer 708, a first adhesive layer 706 of a permanent pressure sensitive adhesive, and a second adhesive layer 710 of a repositionable pressure sensitive adhesive. In its folded condition, which is the initial condition of the tape strip 703, the backing layer 704 is folded around an end portion of the support layer 708. The backing layer includes a first end portion 704a removably adhered to the support layer 708 by the second adhesive layer 710, a second end portion 704b attached to the support layer 708 opposite the first end portion 704a, and a hinge portion 704c that connects the first end portion 704a with the second end portion 704b.

To remove the tape strip 703 from a book 722, the support layer 708 is pivoted upwardly away from the book 722 as shown by arrow A in FIG. 10b, whereby the second adhesive layer 710 separates from the backing layer 704. The tape strip 703 can then be stretch removed from the book 722 by applying a force F to the support layer 708 as shown in FIG. 10c.

Figure 11:
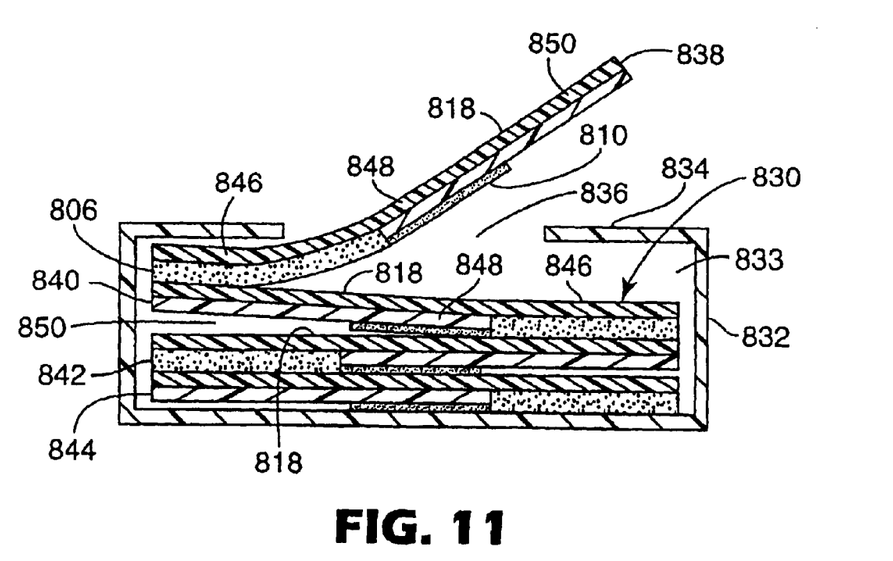
FIG. 11 is a tape dispenser package including a stack of stretch releasable tape flags in accordance with the invention.

The individual stretch releasable tape flags shown and described in FIGS. 1–10 may also be releasably adhered to each other to form a stack of flags that can be individually dispensed from a pop-up type dispenser. FIG. 11 shows a stack of tape flags 830 arranged within a dispenser 832. The dispenser 832 includes walls defining a chamber 833 within which the stack of tape flags 830 are positioned, and a top wall 834 containing a transverse slot 836 through which the uppermost tape flag 838 in the stack 830 projects.

Each tape flag 838, 840, 842, 844 in the stack 830 has the same construction as the tape flag 2 shown in FIGS. 1–3. Each tape flag 838, 840, 842, 844 includes three sections, a first end section 846 including the first adhesive region 806, a middle section 848 including the second adhesive region 810, and a second end section 850 that is adhesive free. The tape flags 838, 840, 842, 844 are arranged in an alternating or zigzag fashion wherein the first end section 846 of each successive tape flag is arranged adjacent the second end section 850 of the next tape flag in the stack 830.

To dispense a single tape flag from the dispenser 832, the second end section 850 of the uppermost tape flag 838 is lifted and pulled until the second end section 850 of the underlying tape flag passes through the slot 836. During dispensing, the top wall 834 of the dispenser 832 may deflect upwardly. The adhesion between successive tape flags is sufficient to pull the second tape flag 840 through the slot 836 but low enough so that the uppermost tape flag 838 will separate from the second tape flag before the remaining tape flags in the stack are pulled through the slot 836. To achieve the proper adhesion level between successive tape flags, a low adhesion backsize is preferably provided on the second major surface 818 of each tape flag 838, 840, 842, 844.

In order that the invention described herein can be more fully understood, the following example is set forth. It should be understood that the example is for illustrative purposes only, and is not to be construed as limiting this invention in any manner.

EXAMPLE

Stretch releasable tape flags of the type shown in FIGS. 1–3 above were constructed as follows. The extensible backing layer was an ABA co-extrusion film available from Aicello Chemical Co. Ltd. Toyohashi Japan. The A was a high atactic polypropylene and the B layer was an LLDPE/octane copolymer. The backing layer had a Young's modulus of 923 psi, an elongation at break of 650%, an MD Taber stiffness of 0.073 g-cm, a CD Taber stiffness of 0.062 g-cm, and a thickness of 50.8 micrometers.

The non-extensible support layer was a polyethylene terephthalate film available from 3M Company, St. Paul, Minn. The support layer had a Young's modulus of 13,632 psi, an elongation at break of 218%, an MD Taber stiffness of 3.91 g-cm, a CD Taber stiffness of 5.26 g-cm, and a thickness of 117 micrometers.

The tensile and elongation testing was conducted per ASTM D-759 using a 5 inch (127.0 mm) gauge length, a 1 inch (25.4 mm) wide sample at 5 inches (127.0 mm) per minute, and the Taber Stiffness was measured according to ASTM D 5650-97 with a specimen size of 1½ inches×0.39 inch (38.1 mm×10 mm)

The extensible backing film was coated with the matte coating described in U.S. Pat. No. 6,251,512. The matte coating was a mixture of Carboset 511 acrylic polymer dispersion from BF Goodrich, ZINPOL 523 acrylic polymer dispersion from BF Goodrich, SURFYNOL DF-110D defoamer from Air Products, SYLOID 74 silica (5 micron) from Grace Davison, and LUVICROSS M crosslinked polyvinyl pyrollidone (6 microns) from BASF. A silicone polyurea release coating was then applied to the matte surface of the backing film using a 300 line Ohio gravure roll. The non-matte surface was coated with a primer comprised of zinc oxide and chlorinated polypropylene using a 300 line Ohio gravure roll. Finally, 4.0 grains (0.26 grams) per 4"×6" (101.6 mm×152.4 mm) of 96/4 iso-octyl acrylate/acrylamide permanent pressure sensitive adhesive was applied to the primed surface of the backing film using a reverse kiss gravure roll coating method.

The support layer of the stretch releasable tape flag was made in the same manner as the backing layer by coating the polyethylene terephthalate film with a matte, release, prime, and adhesive coating. In the case of the support layer, however, repositionable pressure sensitive adhesive stripes were coated and colored ink stripes were printed on the support layer.

Strips of the non-extensible support layer in roll form were then laminated to the extensible backing layer in roll form and wound into a roll. The extensible backing layer was 6 inch (152.4 mm) wide while the strips of support layer were 0.625 inches (15.88 mm) wide. Tape flags of dimension ½" (12.7 mm) wide by 1.625" (41.28 mm) in length were then cut in the cross-direction from the 6" (152.4 mm) wide master material. The resultant construction is shown in FIGS. 1–3 with the permanent pressure sensitive adhesive also serving to bond the extensible backing layer to the non-extensible support layer.

Three stretch release tape flags were applied to each of the following sheets of paper or coated paper:

Bond Paper—Hammermill CopyPlus 00500-7 Standard Weight 20/50 lb, International Paper Company; Memphis, Tenn.

Manila Folder—Globe-Weis® No. 221 1/3 3; American Pad and Paper Company, Dallas, Tex.

Hanging File Folder—Globe-Weis® No. 421 1/5 Red; American Pad and Paper Company, Dallas, Tex.

Catalog Paper—Fisher Scientific Catalog 98/99; Projects Division, Springfield, N.J.

Report Cover—ACCOPRESS® Binder P/N 04500 Blue; ACCO Brands, Inc., Wheeling, Ill.

Five•Star Folder—Pocket and Prong #34002; The Mead Corporation, Dayton, Ohio.

The tape flags were applied by hand near the edge of each sheet of paper with the non-adhesive end portion extending beyond the edge of the sheet of paper. After conditioning overnight in a constant temperature and humidity environment, the stretch release tape flags were removed by hand as shown and described in FIGS. 3a–c above. Each tape flag was tested for surface damage and/or adhesive transfer by visual inspection, and the results are shown in Table 1.

TABLE 1

| Paper | Surface Damage | Adhesive Transfer |
| --- | --- | --- |
| Hammermill Bond | Very slight | None |
| Globe-Weis Manila Folder | Very slight | None |
| Fisher Catalog Page | Very slight | None |
| ACCO Report Cover | Very slight | None |
| Globe-Weis Hanging Folder | Very slight | None |
| Five Star Folder | None | None |

As shown in Table 1, removal of the tape flags resulted in very slight surface damage to five of the papers and no surface damage to the other. In addition, the tape flags removed cleanly (i.e. without leaving any adhesive residue on the paper) from each of the six papers.

The very slight surface damage may attributed in part to the delicate nature of the papers tested. It was observed, however, that the slight surface damage always occurred at the end of the stretch removal process when some fibers would be pulled from the surface of the paper by the terminal portion of the tape flag which would release from the paper without stretching. It was found that this very slight surface damage could be eliminated by pressing the terminal portion of the tape flag against the paper during the stretch removal process. Other techniques for preventing surface damage during the removal process, such as providing a repositionable adhesive along the terminal portion of the tape flag, will also be recognized.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above.

For example, the stretch releasable tape flag may be transparent so that when it is adhered to a substrate, it will not obscure a substrate to which it is attached. Alternatively, an end portion of the stretch releasable tape flag may be printed or died to make it brightly colored (e.g., red, green or yellow) so that the end portion is visually distinctive. The tape flag may also be printed with indicia to provide instructions. In addition, in each of the embodiments shown and described above, the first and second adhesive regions are adjacent and contiguous. It will be recognized, however, that the first and second adhesive regions may be spaced.

Thus, the scope of the present invention should not be limited to the structures described in this application, but only by the structures described by the language of the claims and the equivalents of those structures.

What is claimed is:

1. A stretch releasable adhesive article, comprising:
   (a) an extensible backing having an elongation at break of at least about 50%, said backing including first and second opposed major surfaces, a first end portion and a second end portion;
   (b) a first adhesive region of permanent pressure sensitive adhesive provided on said backing first end portion first major surface;
   (c) a support layer having opposed first and second major surfaces, said support layer second major surface arranged along said backing second end portion first major surface; and
   (d) a second adhesive region of repositionable pressure sensitive adhesive provided on at least a portion of said support layer first major surface;
   wherein the flexural strength of said backing is less than the flexural strength of said support.

2. A stretch releasable adhesive article as defined in claim 1, wherein said second adhesive region is provided adjacent said first adhesive region.

3. A stretch releasable adhesive article as defined in claim 1, wherein said support layer includes a first end portion and a non-adhesive second end portion, said first end portion arranged between said backing and said second adhesive region and said non-adhesive second end portion extending outwardly from between said backing and said second adhesive region.

4. A stretch releasable adhesive article as defined in claim 1, wherein said support layer includes a first end portion arranged between said backing and said second adhesive region and a second end portion extending around at least a portion of said backing second end portion.

5. A stretch releasable adhesive article as defined in claim 1, wherein at least a portion of said backing is arranged between said first adhesive region and a first end portion of said support layer.

6. A stretch releasable adhesive article as defined in claim 5, wherein said support layer includes a first end portion arranged adjacent at least a portion of said backing, an intermediate portion extending from said first end portion beyond said backing, said intermediate portion being provided with said second adhesive region adjacent said backing, and a non-adhesive second end portion extending from said intermediate portion.

7. A stretch releasable adhesive article as defined in claim 1, wherein said support layer includes a first end portion embedded in and surrounded by said backing and a non-adhesive second end portion extending outwardly from said backing.

8. A stretch releasable adhesive article as defined in claim 1, wherein said backing is folded around an end portion of said support layer, and further wherein said backing includes a first end portion removably adhered to said first major surface of said support layer, a second end portion attached to said second major surface of said support layer opposite said first major surface, and a hinge portion connecting said first end portion with said second end portion, whereby said backing first end portion can be separated from said support layer and said support layer can be pivoted to allow the article to be stretched removed from a surface.

9. A stretch removable tape flag for temporarily marking items, comprising:
   (a) an extensible backing layer having an elongation at break of at least about 50%, said backing having first and second opposed major surfaces and first and second end portions, said first end portion first surface including a first adhesive region of a permanent pressure sensitive adhesive; and
   (b) a flexible support layer including a surface having at least a portion attached to said backing layer first surface adjacent said first adhesive region, said support layer including a second adhesive region of a repositionable pressure sensitive adhesive opposite the surface of the flexible support layer attached to said backing layer adjacent said first adhesive region;
   said support layer having a flexural strength greater than said backing layer flexural strength.

10. A stretch releasable adhesive article, comprising:
    (a) an extensible backing including first and second opposed major surfaces, a first end portion, and a second end portion;
    (b) a permanent pressure sensitive adhesive provided on the first end portion of the first major surface of the backing;
    (c) a repositionable pressure sensitive adhesive provided adjacent the permanent pressure sensitive adhesive; and
    (d) a support layer at least partially arranged between the repositionable pressure sensitive adhesive and the second end portion of the first major surface of the backing, the support layer extending beyond the repositionable pressure sensitive adhesive to form a tab;
    wherein the flexural strength of the backing is less than the flexural strength of the support and wherein the support layer is essentially non-extensible.

* * * * *

UNITED STATES PATENT AND TRADEMARK OFFICE
CERTIFICATE OF CORRECTION

PATENT NO. : 6,910,667 B2
DATED : June 28, 2005
INVENTOR(S) : O'Leary et al.

It is certified that error appears in the above-identified patent and that said Letters Patent is hereby corrected as shown below:

Column 9,
Line 35, delete "D-759" and insert -- D-3759 --.

Column 12,
Line 49, delete "repositlonable" and insert -- repositionable --.

Signed and Sealed this

Third Day of January, 2006

JON W. DUDAS
*Director of the United States Patent and Trademark Office*